UNITED STATES PATENT OFFICE.

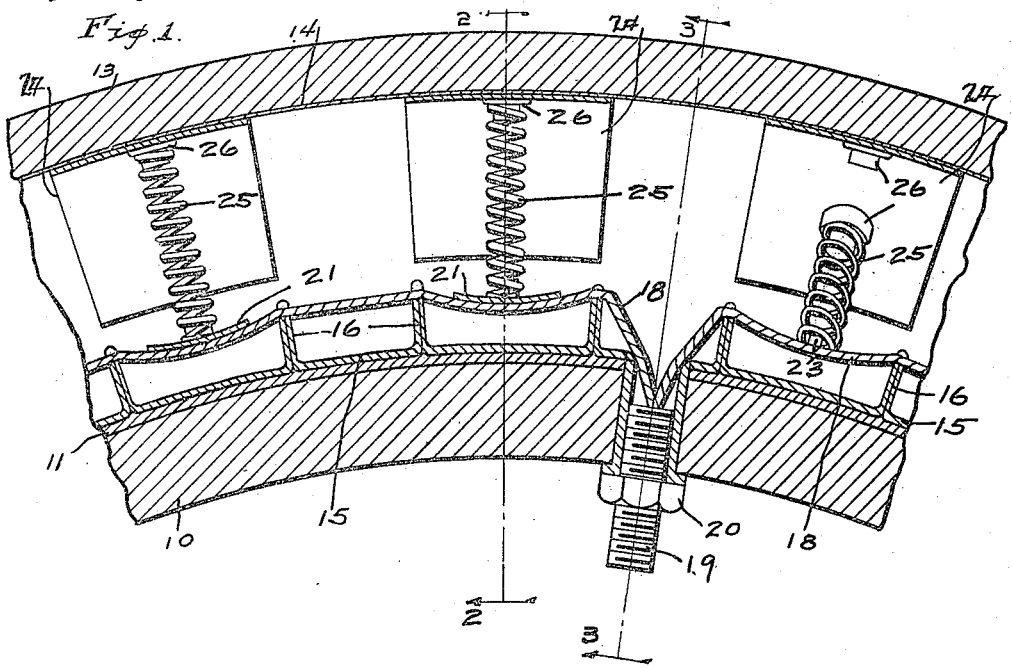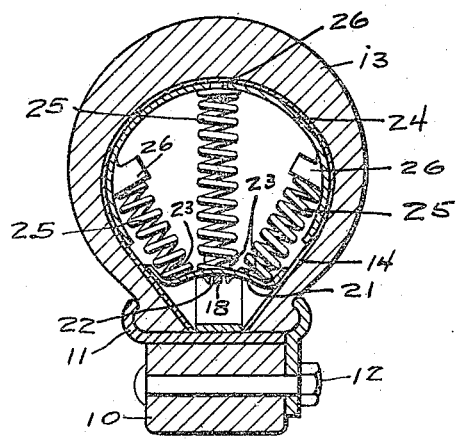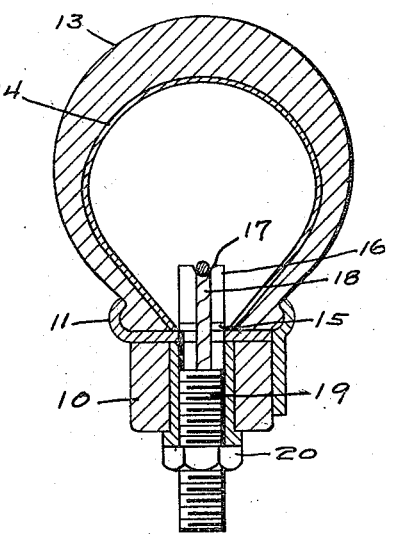

WILLIARD A. ANGLEMYER, OF INDIANAPOLIS, INDIANA.

SPRING-TIRE.

1,244,276.

Specification of Letters Patent.

Patented Oct. 23, 1917.

Application filed February 12, 1917. Serial No. 148,121.

*To all whom it may concern:*

Be it known that I, WILLIARD A. ANGLE-MYER, a citizen of the United States, and a resident of Indianapolis, county of Marion, and State of Indiana, have invented a certain new and useful Spring-Tire; and I do hereby declare that the following is a full, clear, and exact description thereof, reference being had to the accompanying drawings, in which like numerals refer to like parts.

This invention relates to an automobile tire having a spring metal inner lining in place of the pneumatic inner tube ordinarily in use. Its object is to overcome the tire troubles and difficulties due to punctures and blowouts and still have the same resiliency as the pneumatic tire.

The main feature of this invention is the metal spring lining which takes the place of the pneumatic tube and which is reinforced by additional metal spring plates and compression springs so that the ordinary outer casing is held in the same shape and form as it would be by the pneumatic tube. Therefore, this construction provides a tire which to all outward appearances is the same as the pneumatic tire.

Still another feature of the invention is the adjustable means in connection with the compression supporting springs whereby said springs may be adjusted by external means for making the tire hard or soft, as desired, much the same as when air is forced into the tire or let out. By this means the tension on the outer casing may be adjusted according to its riding properties.

The full nature of the invention will be understood from the accompanying drawings and the following description and claims:

Figure 1 is a central vertical section through a wheel rim and tire. Fig. 2 is a cross section on the line 2—2 of Fig. 1. Fig. 3, is a cross section on line 3—3 of Fig. 1.

In the drawings there is shown a felly 10 having a metal rim 11, secured thereto, said clencher rim 11 acts to secure the outer casing to the rim in the same manner as is ordinarily in use, said rim being secured to the felly 10 by the bolts 12. Clenched to the wheel by the clencher rim 11 there is an outer casing 13 made of rubber and similar to that ordinarily used for pneumatic tires. So far, in the invention shown, the construction is that of the ordinary automobile wheel and tire construction.

Extending around the wheel and lying adjacent the inner surface of the outer casing there is a spring metal lining 14 which extends down to the inner edges of said casing. Surrounding the rim 11 and secured thereto, there is an annular band 15 having projections 16 extending outwardly therefrom at given intervals. Said projections are provided with central depressions 17 through which a cable 18 extends, passing over said projections and having its ends secured to a bolt 19 which extends through the valve opening of the wheel rim and which is adjustably held by a nut 20, so that, by adjusting said nut, the cable may be tightened or loosened.

Supported on the cable between the projections 16 there are supporting plates 21 which are provided with depressions 22 in which the cable rides. The lateral edges of said plates rest on the metal lining 14 and as said plates are formed of spring metal the edges thereof will bend outwardly when the plates are moved inwardly toward the rim of the wheel and will straighten out as the plates are moved outwardly. Each plate 21 is provided with three lugs 23 extending outwardly therefrom, one in the center and one on each side thereof. Corresponding with the supporting plates 21, there are reinforcing spring plates 24 placed at intervals around the inner part of the casing lying adjacent the metal lining 14 and extending down each side thereof. Said reinforcing plates are adapted to give added strength and resiliency to the metal lining and are supported against said lining by compression springs 25 which engage the lugs 23 at one end thereof and the corresponding lugs 26 at the other end, said lugs 26 extending inwardly from the supporting plates 24, one lug being in the center of each plate and the other lugs on each side thereof.

It will therefore, readily be seen from the above that the automobile tire casing is yieldingly supported both vertically and laterally by yielding springs, a spring metal lining and supporting plates. If it is desired to have a soft tire the nut 20 is adjusted so that the cable is slackened and the supporting plates 21 are supported by said cable nearer the rim, thereby releasing the tension of the supporting springs. If the tire is desired hardened the cable is drawn taut by the nut 20 and the supporting plates 21 are forced outwardly toward the tire so as to put more tension on the springs 25 and increase the pressure of the spring metal lining against the casing.

The invention claimed is:

1. A tire structure comprising a casing, a spring metal lining within said casing and conforming to the shape thereof, a plurality of metal reinforcing plates engaging the crown of said lining, each plate having a plurality of studs projecting inwardly therefrom, a plurality of supporting plates near the base of said casing and having their edges engaging the walls of the lining, said supporting plates being formed of spring metal whereby when the plates are moved into the restricting portion of the lining they will bend adjacent their edges and will expand when moved into the wider portion of the lining, each of said supporting plates also having a plurality of studs projecting outwardly therefrom, compression springs extending from said supporting plates to said reinforcing plates and having their ends engaged with said studs.

2. A tire structure comprising the combination with a casing, of an annular band adapted to rest between the edges of the casing, said band having portions thereof crimped and the crimped portions pressed together to form projections, the free ends of said projections having central depressions, a cable extending around the band means to increase or decrease the tension of said cable, supporting plates passing over said cable, said plates being of spring metal whereby when moved in one direction their edges will contract and when moved in the opposite direction said edges will expand and compression springs carried by said plates.

In witness whereof, I have hereunto affixed my signature.

WILLIARD A. ANGLEMYER.

Copies of this patent may be obtained for five cents each, by addressing the "Commissioner of Patents, Washington, D. C."